June 8, 1954 W. H. BAGLEY 2,680,380
BUILT-UP PULLEY
Filed March 29, 1950

Inventor
William H. Bagley
Barthel & Bugbee
Attorneys

Patented June 8, 1954

2,680,380

UNITED STATES PATENT OFFICE 2,680,380

BUILT-UP PULLEY

William H. Bagley, Detroit, Mich.

Application March 29, 1950, Serial No. 152,593

3 Claims. (Cl. 74—230.8)

This invention relates to machine elements and, in particular, to pulleys.

One object of this invention is to provide a pulley which is fabricated from metal stampings, yet which will have the strength and wearing qualities of a cast metal pulley without its weight and, in the case of cast iron, its fragility.

Another object is to provide a pulley of the foregoing character which is so constructed as to possess an unusually great thickness at the hub in proportion to its diameter, thereby imparting to it an increased section modulus which prevents the failures of prior stamped pulleys resulting from their inadequate hub thickness.

Another object is to provide a pulley of the foregoing character wherein the two stampings of which the pulley is constructed are of such shape and combined in such a manner as to enable the stampings to be made of metal of approximately half the thickness of prior stamped pulleys, yet possess equal strength and greater length of life, as well as greater ease and lower cost of manufacture, together with a lowered rate of wear of the dies.

Hitherto, there has been a great demand for a pulley which will be inexpensive to manufacture yet will have adequate strength and long life under hard conditions of use. In the automotive industry there has been a particular demand for such a pulley to be used, for example, for driving the engine fan from the fan belt. Until comparatively recently, most of the fan belt pulleys in use were cast pulleys, but these are being replaced by stamped pulleys because of their lower cost of manufacture. Such stamped pulleys are commonly made with a cup-shaped stamping having an inclined peripheral flange forming one wall of the fan belt groove, the opposite wall being formed by an annular member with an oppositely-inclined flange spot-welded, brazed or otherwise united to the pulley stamping. This stamping, however, ordinarily has only a single thickness of material at the hub and consequently most failures of such pulleys occur at the hub. Moreover, the annular member is an expensive article to produce because the disc of metal punched out of its center is mere scrap, even though it contains a considerable quantity of material. Where the web of the pulley as well as its V-groove periphery are made from a single stamping, or are formed by spinning sheet steel, the hub portion is still only a single thickness and the pulley usually fails at the hub for that reason.

The present invention provides a built-up pulley formed from a pair of cup-shaped stampings which are spaced apart from one another at their hubs so as to provide an increased section modulus at the hub and consequently a greatly increased purchase on the fan belt shaft or fan. This results in a greatly reduced wear, a consequently lengthened life and a great lessening in the number of hub failures of such pulleys. Moreover, the construction of the pulley enables much thinner metal to be used for its two halves, resulting in economy of manufacture, yet with a greater strength than the single web pulleys hitherto provided by stamping or spinning processes.

Figure 1:
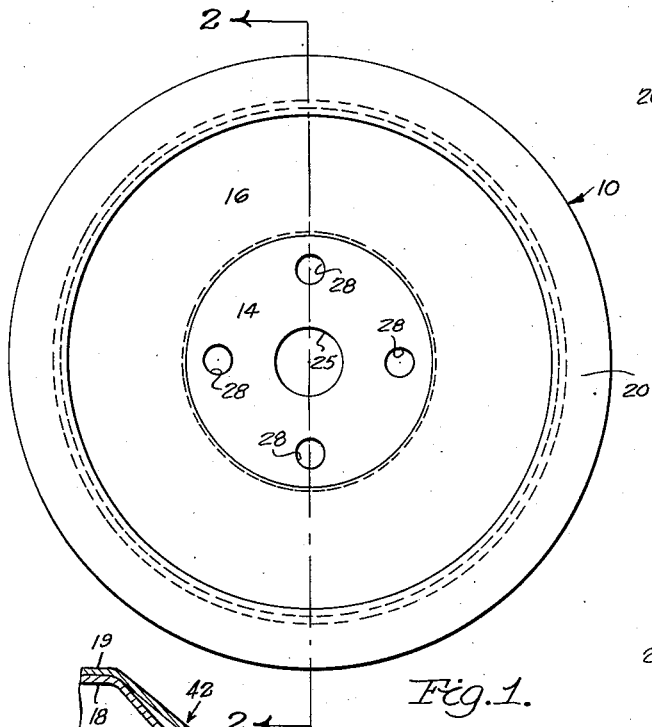
Figure 1 is a front elevation of a fabricated stamped metal pulley, according to one form of the invention.

Referring to the drawings in detail, Figure 1 shows a fabricated pulley, generally designated 10, built up from a pair of cupped inner and outer stampings, generally designated 11 and 12 respectively, the central portions of which are separated from one another by a disc-shaped spacer, generally designated 13. The inner and outer pulley halves 11 and 12 are composed of disc-like hub portions 14 and 15 which are joined by outwardly-flared or partially-conical portions 16 and 17 to approximately cylindrical nesting peripheral portions 18 and 19 terminating in oppositely-inclined annular peripheral flanges 20 and 21 respectively bent away from one another so as to form an annular peripheral belt groove 22 adapted to receive a conventional V-belt (not shown). The cylindrical peripheral portions 18 and 19 and the disc-like hub portions 14 and 15 are secured to one another as at 23 and 24 respectively by welding, brazing or any other suitable means. The hub portions 14 and 15 and the spacer 13 are provided with central aligned holes 25, 26 and 27 and with peripherally-spaced aligned holes 28, 29 and 30 respectively. The holes 25, 26 and 27 are adapted to receive a shaft (not shown) and the holes 28, 29 and 30 are adapted to receive fasteners, such as bolts, by which the pulley 10 is drivingly secured to the shaft or other member which it is intended to drive.

Thus, in the manufacture of the pulley 10, it will be seen that substantially all of the metal for both the inner and outer halves 11 and 12 is utilized and only a very small portion punched out of the holes is discarded as scrap. The separation of the hub portions 14 and 15 by the hub spacer 13 gives the pulley 10 a greater purchase upon the shaft or the member to which it is secured, and also gives the pulley a greater strength due to its increased section modulus at a location corresponding to the peripheral edge 31 of the spacer 13.

Figure 3:
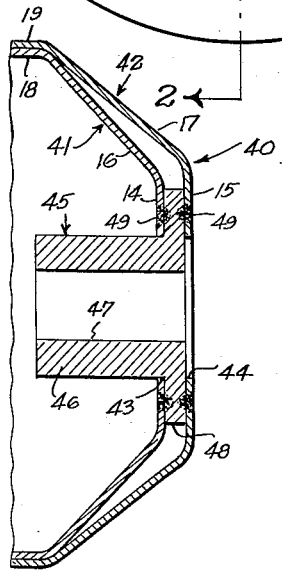
Figure 3 is a central vertical section through a modification of the pulley shown in Figures 1 and 2.

The modified pulley, generally designated 40, shown in Figure 3 has inner and outer halves, generally designated 41 and 42 having portions 14 to 21 of similar construction to the halves 11 and 12 of the pulley 10 and therefore similarly designated with reference numerals. The belt groove flanges 20 and 21 have been omitted in Figure 3. The central portions 14 and 15, however, are provided with central apertures 43 and 44 respectively. In place of the spacer 13 of the pulley 10, a sleeve-like hub 45 is used. The hub 45 has a sleeve-like portion 46 with a central bore 47 for receiving a shaft, and a peripheral annular flange 48 at one end secured by welding or otherwise at the locations 49 to the central portions 14 and 15 of the pulley halves 41 and 42. The modified pulley 40 has the same advantages as the pulley 10 and is adapted to be keyed or otherwise secured to a shaft rather than bolted to a rotary member, as is the case with the pulley 10. The hub 45 is preferably formed of cast metal, such as cast iron.

Figure 4:
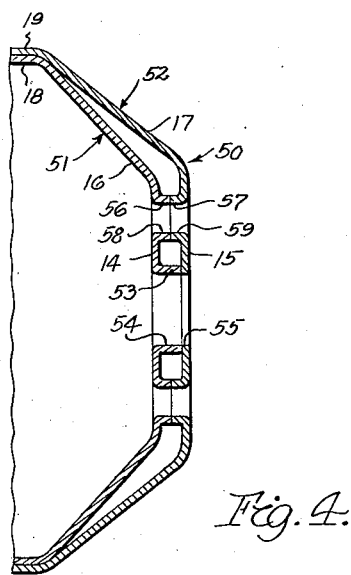
Figure 4 is a central vertical section through a further modification thereof.

The modified pulley 50, shown in Figure 4, likewise has inner and outer halves 51 and 52 provided with similar portions to the pulley 10 and similarly designated with reference numerals 14 to 21 inclusive. The belt groove flanges 20 and 21 have been omitted in Figure 4. The spacer 13 of the pulley 10 is omitted in the pulley 50 and, instead, the pulley halves 51 and 52 are spaced apart from one another by inwardly struck central portions 53 in the pulley half 51 forming a central bore 54 aligned with a corresponding hole 55 in the outer half 52. Further spacing is provided by inwardly struck flanges 56 and 57 in the inner and outer pulley halves 51 and 52 forming aligned holes 58 and 59 for receiving bolts or other fasteners. The edges of these inwardly struck flanges 56 and 57 engage one another and consequently space the hub portions 14 and 15 apart from one another without the necessity for a separate spacer, such as the spacer 13 of the pulley 10.

Figure 2:
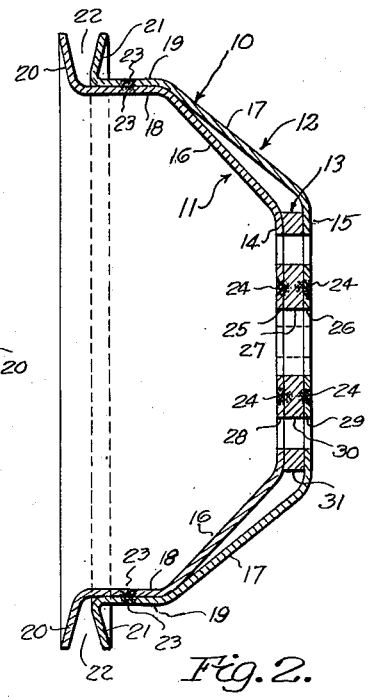
Figure 2 is a central vertical section through the pulley, taken along the line 2—2 in Figure 1.

The operation of the invention is believed to be self-evident from the foregoing description of the construction. The pulley is secured to a rotary member, such as a shaft or a head on a shaft, either by bolts or by a key or set screw, depending upon the form of the pulley. A conventional V-belt is used to drive the pulley in the usual way, and the strain due to the pull of the belt is easily sustained by the spaced central portions 14 and 15 separated from one another either by the spacer 13 (Figure 2), the spacing flange 48 (Figure 3) or the inwardly struck tubular portions or flanges 53, 56, 57 (Figure 4).

What I claim is:

1. A built-up pulley comprising a centrally-disposed annular spacer with axially-spaced opposite sides, and a pair of cupped pulley halves of sheet material facing in the same direction, said pulley halves having annular disc-shaped central portions spaced axially apart from one another and secured firmly to said opposite sides of said spacer, said pulley halves also having approximately conical intermediate portions of different inclinations integral with and converging toward one another from said axially-spaced central portions into engagement with one another at an annular junction disposed outwardly and offset axially from said central portions, said pulley halves also having annular nesting peripheral portions integral with and connected to said conical intermediate portions, said pulley halves also having oppositely-inclined peripheral flanges integral with and connected to the outer edges of said annular nesting peripheral portions and cooperating with one another to form a belt groove, said nesting peripheral portions being secured firmly to one another against relative motion therebetween.

2. A built-up pulley comprising a centrally-disposed annular spacer with axially-spaced opposite sides, and a pair of cupped pulley halves of sheet material facing in the same direction, said pulley halves having annular disc-shaped central portions spaced axially apart from one another and secured firmly to said opposite sides of said spacer, said pulley halves also having approximately conical intermediate portions of different inclinations integral with and converging toward one another from said axially-spaced central portions into engagement with one another at an annular junction disposed outwardly and offset axially from said central portions, said pulley halves also having annular nesting peripheral portions integral with and connected to said conical intermediate portions, said pulley halves also having oppositely-inclined peripheral flanges integral with and connected to the outer edges of said annular nesting peripheral portions and cooperating with one another to form a belt groove, said nesting peripheral portions being secured firmly to one another against relative motion therebetween, said nesting peripheral portions comprising telescoping outer and inner cylindrical portions coaxial with one another and engaging one another between said flanges and said junction.

3. A built-up pulley comprising a centrally-disposed annular spacer with axially-spaced opposite sides, and a pair of cupped pulley halves of sheet material facing in the same direction, said pulley halves having annular disc-shaped central portions spaced axially apart from one another and secured firmly to said opposite sides of said spacer, said pulley halves also having approximately conical intermediate portions of different inclinations integral with and converging toward one another from said axially-spaced central portions into engagement with one another at an annular junction disposed outwardly and offset axially from said central portions, said pulley halves also having annular nesting peripheral portions integral with and connected to said conical intermediate portions, said pulley halves also having oppositely-inclined peripheral flanges integral with and connected to the outer edges of said annular nesting peripheral portions and cooperating with one another to form a belt groove, said nesting peripheral portions being secured firmly to one another against relative motion therebetween, said spacer comprising an axially-directed spacing portion integral with and extending axially from at least one of said central portions toward and into engagement with the other central portion.

References Cited in the file of this patent

UNITED STATES PATENTS

| Number | Name | Date |
| --- | --- | --- |
| 122,456 | Grimshaw | Jan. 2, 1872 |
| 1,756,592 | Harrison | Apr. 29, 1930 |
| 1,756,720 | Anderson et al. | Apr. 29, 1930 |
| 1,845,802 | Laddon et al. | Feb. 16, 1932 |
| 1,848,144 | Pribil | Mar. 8, 1932 |
| 2,092,571 | Cole | Sept. 7, 1937 |